United States Patent [19]
Martin et al.

[11] 3,911,065
[45] Oct. 7, 1975

[54] LIQUID AERATOR OR THE LIKE

[75] Inventors: Ernest J. Martin, Rolling Meadows; Bernard A. Hurless, Rockford, both of Ill.

[73] Assignee: Ernest J. Martin, Rolling Meadows, Ill.

[22] Filed: July 30, 1973

[21] Appl. No.: 384,078

Related U.S. Application Data

[63] Continuation-in-part of Ser. No. 352,045, April 17, 1973, abandoned.

[52] U.S. Cl. ............................. 261/91; 261/120
[51] Int. Cl.² ........................................ B01F 3/04
[58] Field of Search .......... 261/91, 84, 89, 83, 120; 239/219, 221, 214

[56] References Cited
UNITED STATES PATENTS

| | | | |
|---|---|---|---|
| 2,054,395 | 9/1936 | Streander | 261/91 |
| 2,072,944 | 3/1937 | Durin | 261/91 |
| 2,148,446 | 2/1939 | Drake | 261/91 |
| 2,165,889 | 7/1939 | Fischer et al. | 261/91 |
| 2,186,371 | 1/1940 | Durdin, Jr. | 261/91 |
| 3,416,729 | 12/1968 | Ravitts et al. | 261/91 |
| 3,470,092 | 9/1969 | Bernard | 261/91 |
| 3,521,864 | 7/1970 | Welles, Jr. | 261/91 |
| 3,680,845 | 8/1972 | Carlsmith et al. | 261/91 |

*Primary Examiner*—Frank W. Lutter
*Assistant Examiner*—William Cuchlinski, Jr.
*Attorney, Agent, or Firm*—Darbo, Robertson & Vandenburgh

[57] ABSTRACT

A tube extends vertically downward with part of the tube above and part below the surface of a body of water. It is held at this location by a float. A shaft extends axially down the tube and is rotated by a motor positioned substantially above the top of the tube. One or more impellers forces the water up the tube and throws it out through the space between the top of the tube and the bottom of the motor. In one embodiment there is an impeller at the bottom of the tube and an impeller above the top of the tube, the latter having an inverted truncated conical hub and its blades pitched so as to throw the water outwardly. In another embodiment the top of the tube flares outwardly and a single impeller is positioned in this outwardly flared portion, with its bottom below the surface of the water. Another embodiment has a plurality of tubular scoops at the top of the tube and affixed to the shaft for rotation therewith in a direction such that the water is thrown upwardly and outwardly from the central openings of the tubular scoops.

15 Claims, 10 Drawing Figures

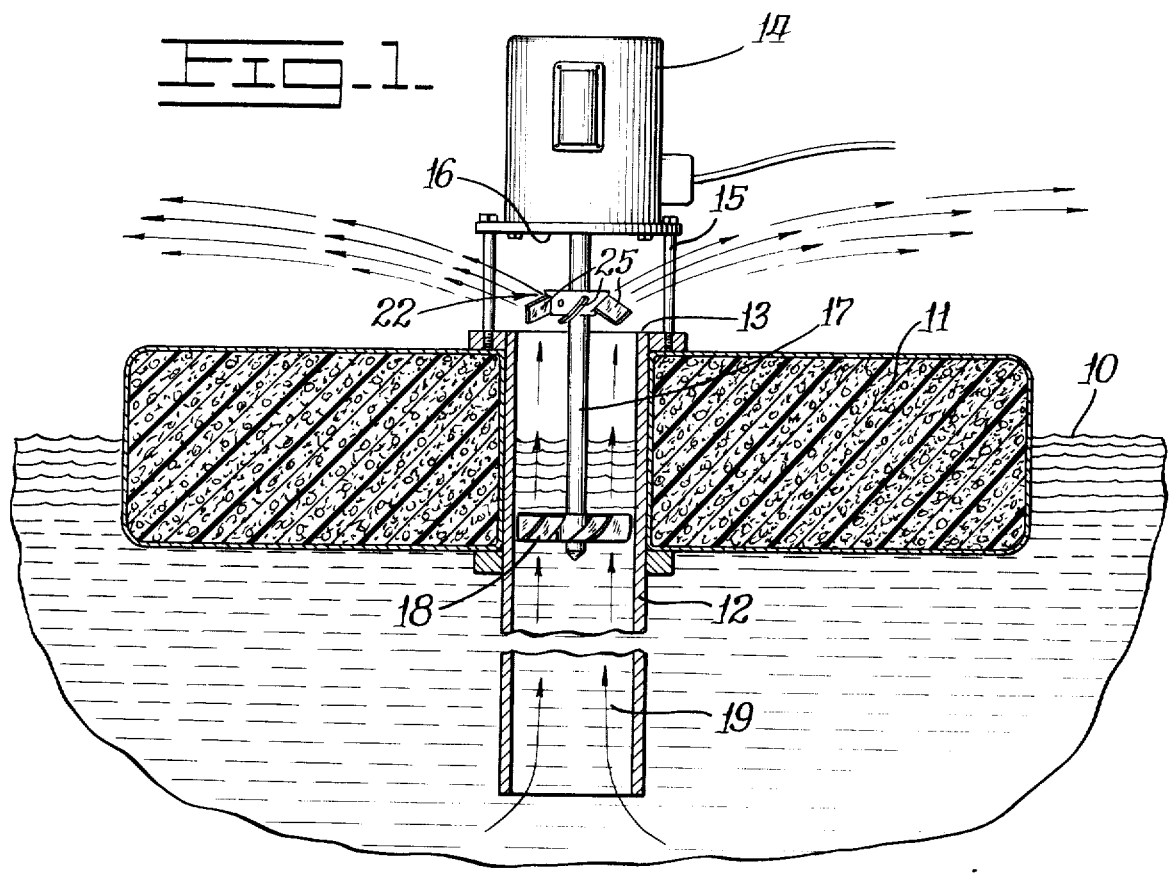
Fig_1_
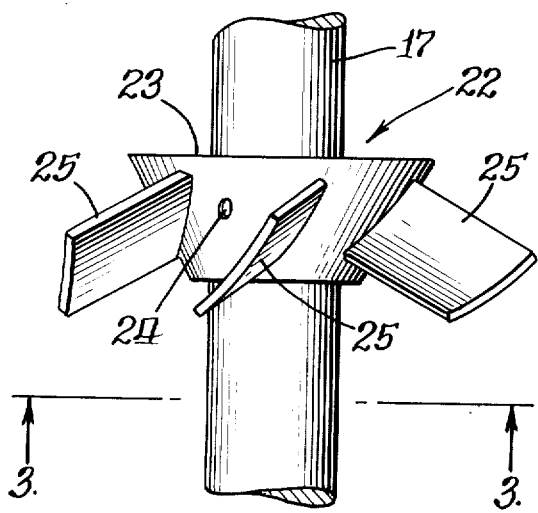
Fig_2_
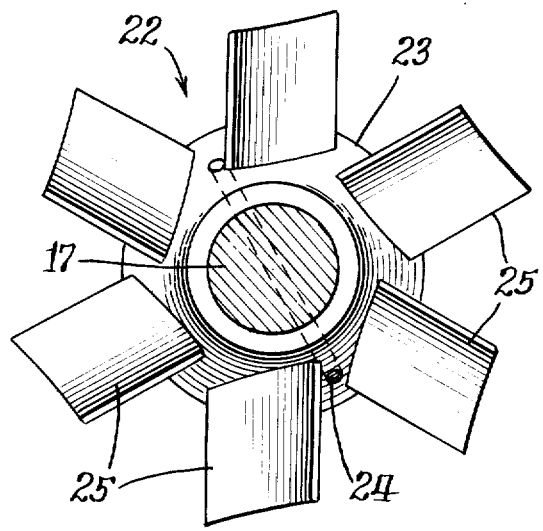
Fig_3_

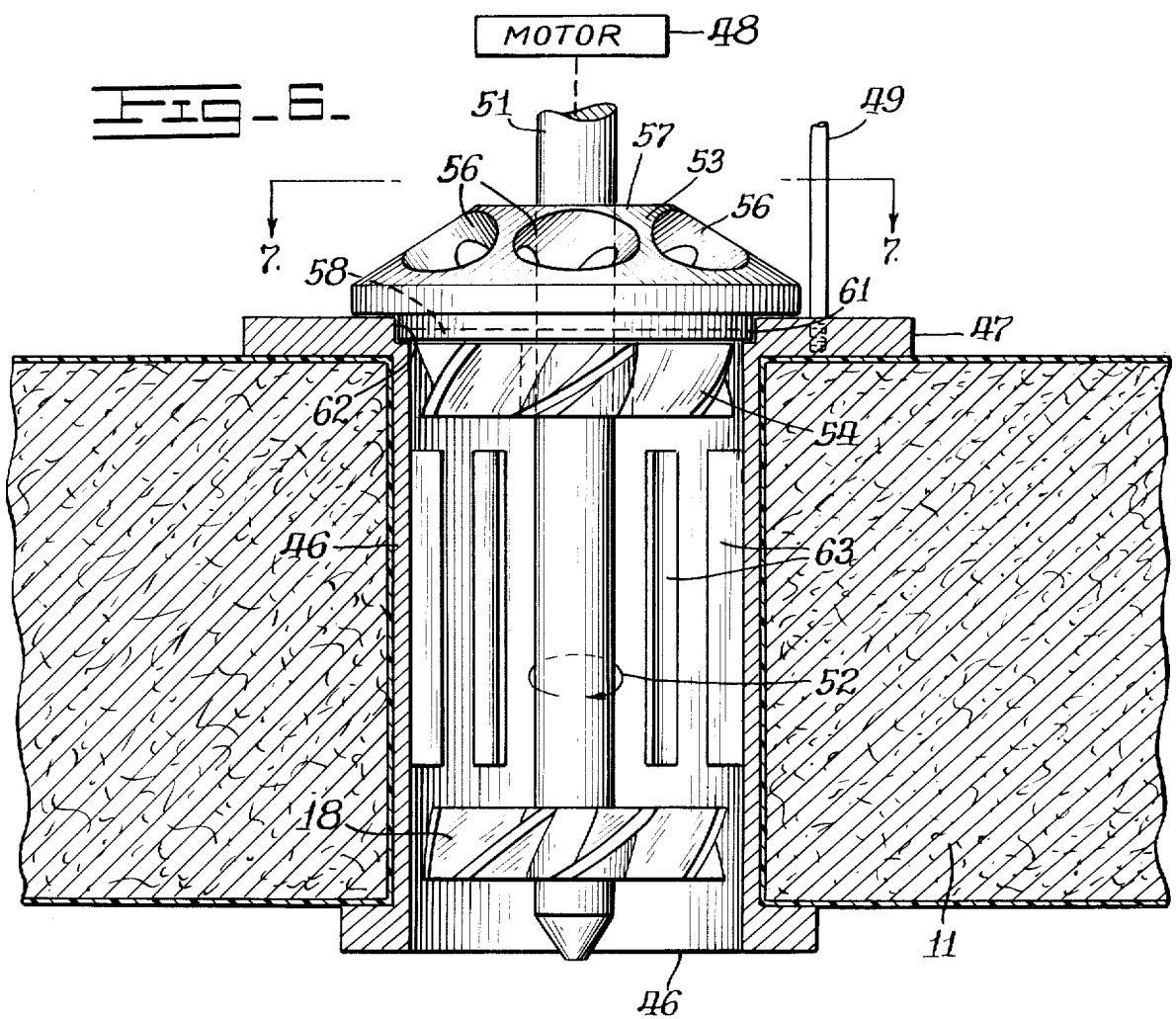
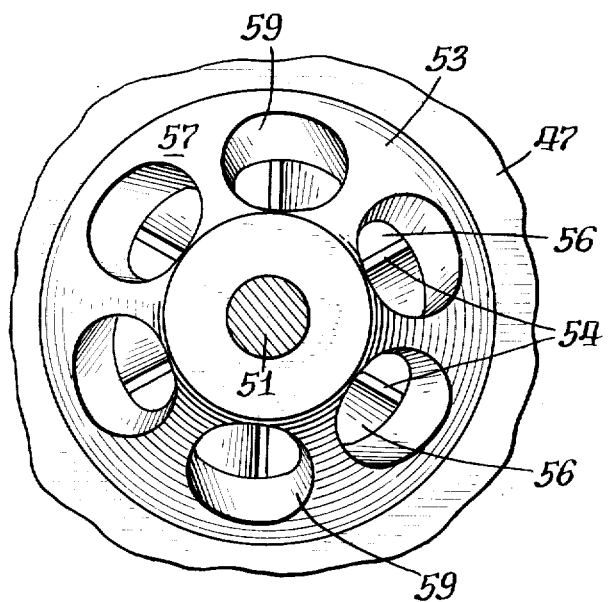
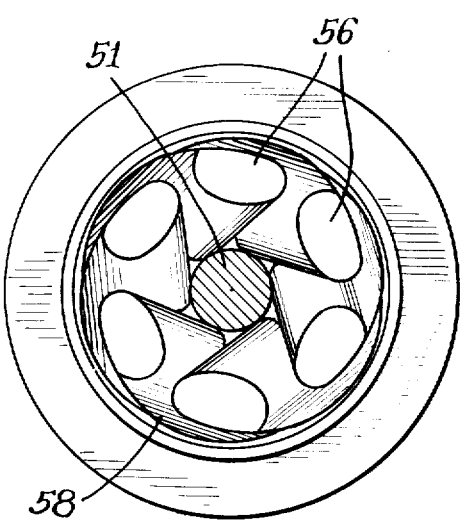

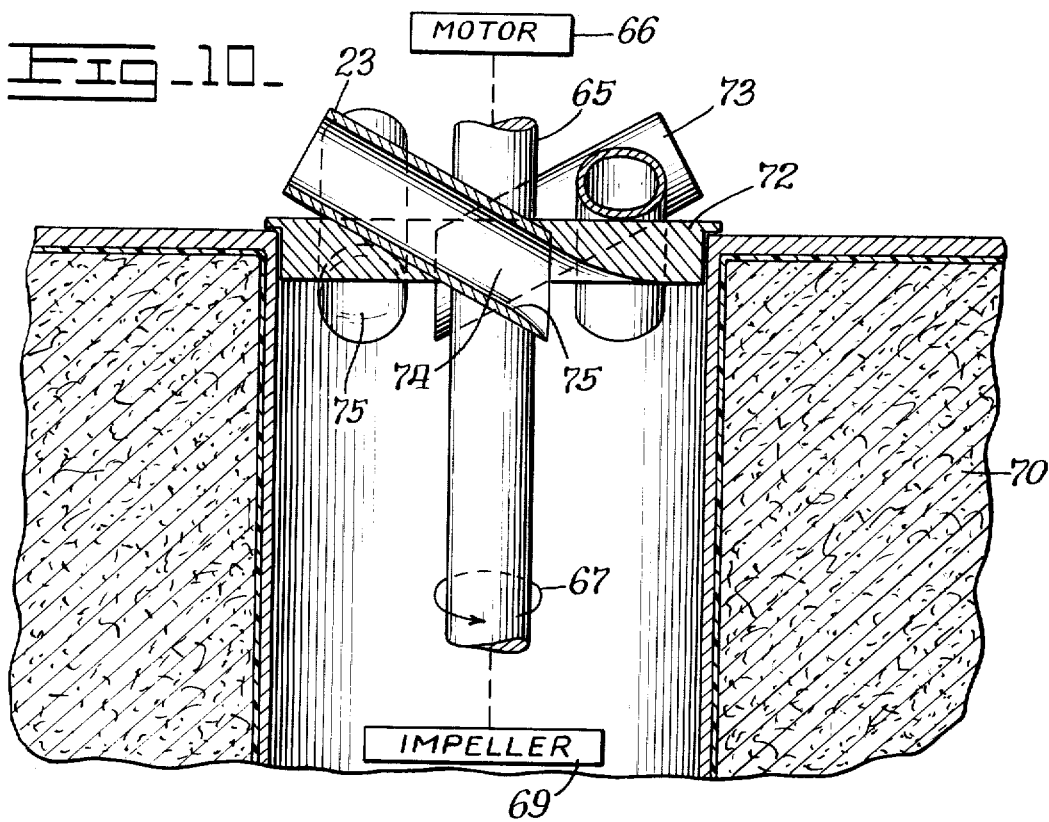
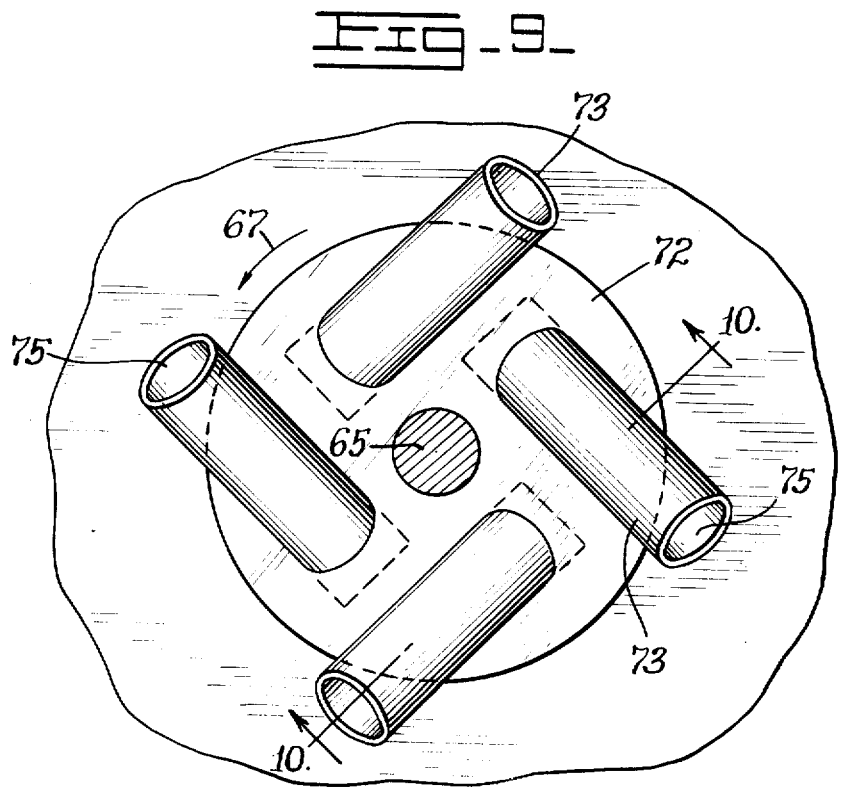

3,911,065

LIQUID AERATOR OR THE LIKE

RELATED APPLICATION

This is a continuation-in-part of pending application Ser. No. 352,045, filed Apr. 17, 1973, now abandoned.

BACKGROUND AND SUMMARY OF THE INVENTION

A common application for devices of the type with which the present invention deals is the aeration of water or other liquid, as for example in a fish pond, a sewage treatment tank, etc. They are also employed in water cooling ponds, etc. By the use of power driven impellers in a vertically positioned tube, the liquid is drawn up from below the surface of the body of liquid and then is redirected outwardly above the top of the tube to fall back into the body of liquid. Since the water is rising vertically in the tube and it is necessary to have it move outwardly above the top of the tube, something must be done to turn the path of movement of the water. The usual prior art practices have been to use an inverted conical deflector about the impeller shaft which deflector will change the movement of the water, the deflectors being sometimes fixed (U.S. Pat. No. 2,186,371) and sometimes rotating (U.S. Pat. Nos. 3,416,729 and 3,669,422). The present invention achieves this turning of the direction of the water by an impeller having blades so positioned that the impeller imparts an outward horizontal component to the path of movement of the water (there continuing to be a vertical component also). Comparative tests made between such an impeller and a device using a prior art inverted conical, rotating deflector have shown that more water is pumped with the former than with the latter. In one such test the former pumped 300 gallons per minute while the latter pumped 272 gallons per minute (using the same motor and power consumption). While this may seem like a relatively small difference, it must be remembered that many of the devices with which the present invention deal are operated for 24 hours a day, 365 days a year. Under such circumstances, even a very small difference in efficiency can amount to substantial monetary savings.

While we are not positive as to why this difference occurs, we believe that the inverted conical deflector of the prior art necessarily introduces friction into the system in the process of introducing a horizontal component of movement into the water. In our device, the impeller means on the shaft gives the water the outward component of movement without introducing friction to the extent that occurs in the case of a deflector.

To obtain this increased efficiency, the volume of the open passageway in the tube, commencing with the lowermost portion of the impeller means, should not significantly decrease up to the top of the impeller. Otherwise, there is a choking of the water in the passageway which increases the friction and therefore reduces efficiency.

We are aware that in some prior art humidifiers there has been a horizontal plate having radial fins therebelow and integral therewith, which has been employed to engage water forced upwardly against the underside of the plate and throw that water outwardly in a spray. These are not suitable for the aerator or cooler applications with which devices of the present invention are concerned, one reason being that the purpose of such humidifier devices is to atomize the water and cause it to evaporate. This would result in a water loss which could not be tolerated in the applications with which the present invention is concerned. Thus the pumps with which the present invention are concerned throw the water out (with an accompanying upward component of movement) in a substantially annular sheet which may ultimately terminate in comparatively large size drops.

The blades at the top of the tube can merely extend out from a hub in the form of a wing with no restriction as to the movement of the liquid to, about and from the blade. Alternatively, each block can form the floor of a respective enclosed passageway. The latter arrangement enables the achievement of streams which will extend outwardly to a greater extent with larger drop size (other conditions being equal), and these conditions can be varied by appropriate shaping of the passageway.

DESCRIPTION OF THE DRAWINGS

FIG. 1 is a vertical section through an embodiment of the invention;

FIG. 2 is an enlarged view of the upper, motion changing, impeller of the embodiment of FIG. 1;

FIG. 3 is a bottom view as seen at line 3—3 of FIG. 2;

FIG. 6 is a vertical section through an alternative embodiment;

FIG. 7 is a horizontal section as viewed at line 7—7 of FIG. 6;

FIG. 8 is a view at the underside of the top impeller of FIGS. 6 and 7;

FIG. 9 is a horizontal section through another embodiment; and

FIG. 10 is a vertical section as viewed at line 10—10 of FIG. 9.

DESCRIPTION OF SPECIFIC EMBODIMENTS

Figure 4:
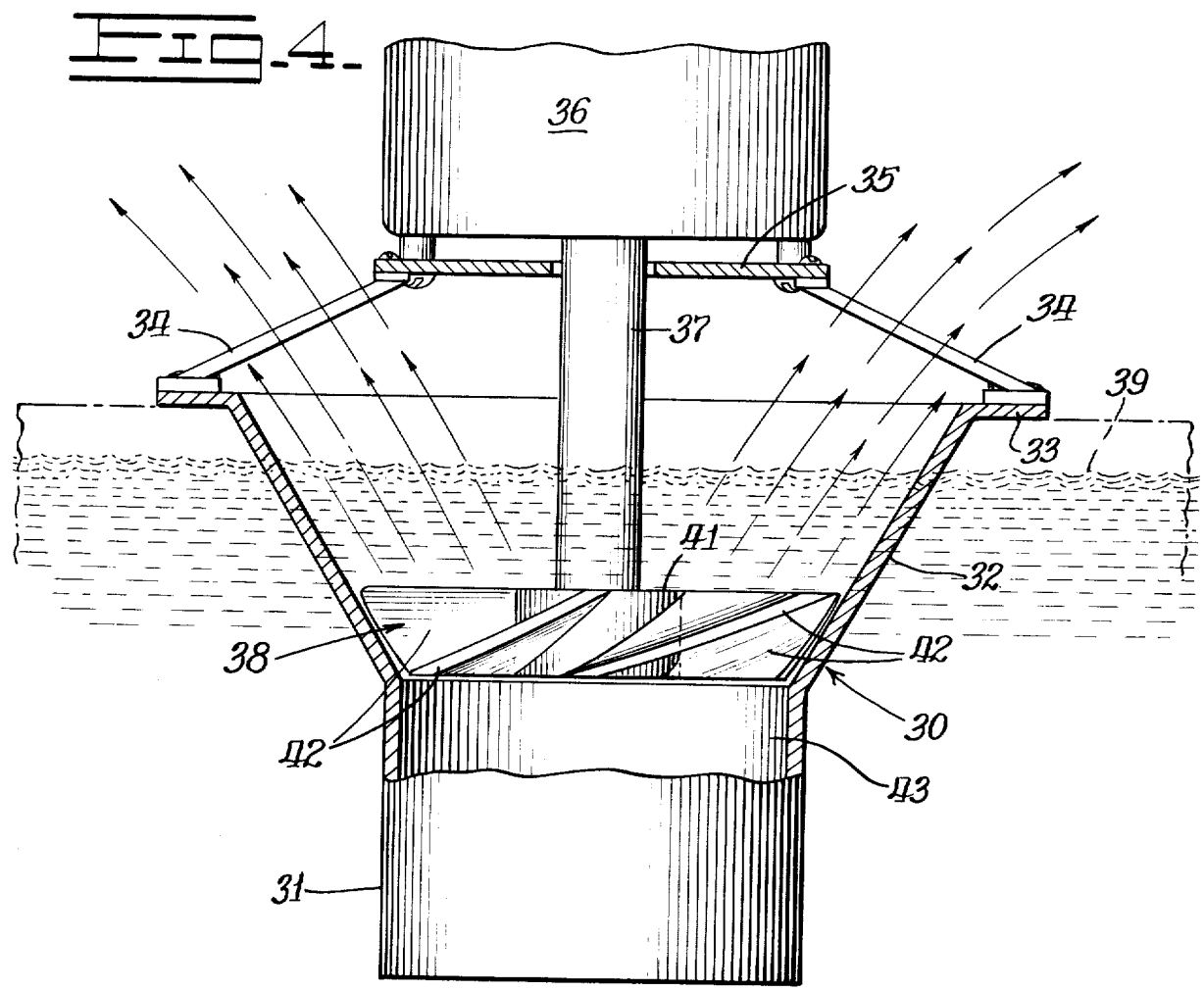
FIG. 4 is a fragmentary elevational view, with portions broken away, illustrating a second embodiment.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

For purposes of illustration, the apparatus of FIG. 1 is employed to aerate the water in a body of water 10. A tube 12 is centrally located in a float 11. Positioned above the top 13 of the tube is an electric motor 14. The motor is held in this position by supports 15. These supports are secured to a plate 16 on which the motor is mounted. In some embodiments the supports will be affixed directly to the bottom of the motor. For the purposes of the discussion herein the plate 16 can be considered the bottom of the motor. The supports 15 are small in cross-section so that by far the most of the space between the plate 16 and the top 13 of the tube is an opening. Extending downwardly from the bottom of the motor is a shaft 17. Secured to the shaft and positioned below the surface level of the water is an impeller or propeller 18. The shaft and impeller are in a passageway 19 formed by tube 12.

As thus far described, the apparatus, although not necessarily identical to, is representative of prior art structures. When the motor is running the rotation of the impeller 18 forces the water upwardly in the passageway 19. As this occurs, water keeps flowing into the bottom of the tube. The water exits from the top 13 of the tube with considerable force and must be turned so that it then moves out the sides in the space between the tube top 13 and the bottom of plate 16. Contact with a flat plate, such as 16, will necessarily cause the water to turn. As previously mentioned, some prior art devices employ inverted conical members about shaft 17 purportedly to facilitate the turning of the water.

In accordance with the present invention, a second impeller, generally 22, is secured to the shaft in a position such that it is just slightly above the top 13 of the tube. While it has been operated in a structure such as FIG. 1 at a location at which it is partially within the uppermost portion of the tube 12, it appears that there is an improvement in efficiency by having the impeller fully exposed above the top of the tube. The impeller should be substantially below the upper horizontal surface, which in the illustrated embodiment is plate 16, but could be the actual bottom of the motor depending upon other arrangements for holding the motor in the raised position. Where the shaft 17 extends through the bottom of the motor it is provided with ordinary shaft seals. There need not necessarily be a closed opening or seal where the shaft passes through plate 16, but this could be provided, if desired.

The impeller 22 comprises a hub 23 which is connected to the shaft 17 as by means of a pin 24 extending through the hub and shaft. Extending outwardly from the hub 23 are six blades 25. These blades are so positioned that when they contact the water being forced out of the top 13 of the tube by reason of the action of impeller 18, the contact between that water and the blades 25 imparts a horizontal component to the path of movement of the water (which up to that time had been moving solely in a vertical direction). It is important to note that this is only a horizontal component and that there is still a vertical component to the path of movement of the water. A paddle wheel arrangement where the blades were positioned in radial planes which included the axis of shaft 17 would result in quite a different action than is achieved by the impeller 22 in accordance with the present invention. In the present arrangement the blades of the impeller act as scoops which throw the water upwardly; however, an outward component is also provided by the slant of the blade surface (as well as by reason of centrifugal force).

It will be noted that in the illustrated embodiment the hub 23 has the external configuration of an inverted frustum of a cone. This is done not to achieve a deflection of the rising water (as in the case of the prior art deflectors) but rather to simplify the manufacture of the impeller, namely the mounting of the blades 25 in the hub. That is, the blades 25 are normal to the periphery of the hub rather than being canted with respect thereto as would be the case if the periphery of the hub were cylindrical. To aid in achieving the horizontal component of motion of the water as it leaves the impeller, the impeller blades are canted downwardly with respect to the axis of the shaft 17. In the illustrated embodiment this downward cant is 30°. In addition, the blades have a thirteen pitch. The term "pitch" is used herein in the conventional sense of meaning — the amount of advance (in inches) of a screw thread in a single turn.

In a specific embodiment constructed in accordance with FIGS. 1–3, the diameter of passageway 19 was 4 inches. The lower tips of the impeller blades 25 were less than ½ inch above a top 13 of the tube. The distance between top 13 and plate 16 was 3⅜ inches. The hub 23 was about 1½ inches below the plate 16 and had an axial dimension of about 1 inch. Motor 14 was a ½ horse power motor. This unit would pump 300 gallons a minute. With this arrangement, there was no appreciable decrease in the area of opening for the flow of water between the point at which the water commenced to move up the tube above impeller 18 and the point at which the water exited from the space between the top of the tube and the plate 16 (i.e. about posts 15). To the extent that a reduction in area does occur, this introduces a "choking" of the water flow and thereby introduces increased friction, reducing efficiency. If one were seeking to throw the water further, it might be that some such choking could be tolerated, but it should be recognized that it will be done at the cost of a loss of efficiency. There is no question but that the throw of the water with the embodiment of FIGS. 1–3 is more than sufficient for an apparatus for aerating a body 10 of water (or which could be the aeration of a liquid such as sewage, etc.).

The lower impeller 18 forces the water up through passageway 19 to the extent that there is, in effect, a solid column of water having a diameter corresponding to that of the passageway impinging on the upper impeller 22. In this sense the impeller 22 is at the top of the tube 12. The upper impeller then takes this column and distributes it outwardly as described elsewhere.

The extent to which tube 12 extends below float 11 will depend upon the desires of the manufacturer, the use to which the apparatus is to be put, etc. Normally just a few inches will suffice unless a draw of the deeper liquid is desired. Of course, lengthening the tube introduces increased friction into the system.

Figure 5:
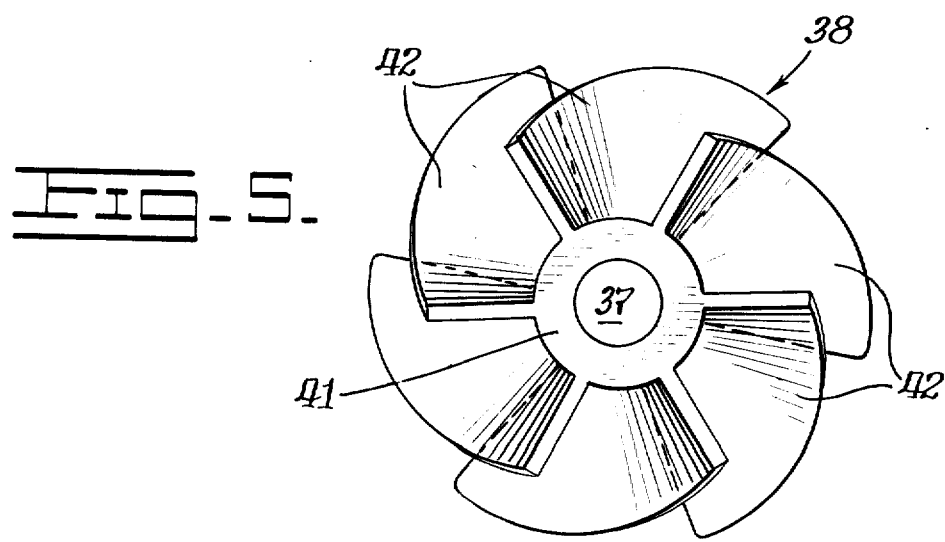
FIG. 5 is a bottom view of the impeller of the embodiment of FIG. 4.

In the embodiment of FIGS. 4–5 there is a tube, generally 30. It is mounted on a suitable support, which could be something such as float 11 or a standard mounted on the bottom of a tank, etc. The lower part 11 of the tube is cylindrical while the upper part 12 is an inverted frustum of a cone. This upper part terminates in a flange 33. Secured to the flange are supports 34 carrying a plate 35 on which motor 36 is mounted. The motor has a shaft 37 which is coaxial with the tube 30. At the lower end of this shaft is an impeller, generally 38. The impeller is below the normal water line 39.

The impeller 38 comprises a body or hub 41 having six blades 42 integral therewith. In the illustrated embodiment the lower part of passageway 43 has a diameter of 6 inches and the periphery of the bottom of the impeller is corresponding. The hub is 2 inches in diameter. The blades 42 have a 5½ pitch. This is used with a one horse power motor.

In this embodiment the single impeller performs the dual function of providing the initial impetus to the water moving up the tube and at the same time giving that water a horizontal component of motion. Again, it should be noted that this impeller is a substantial distance below the upper horizontal surface (in this case the bottom of plate 35). Also, there is no choking of the passageway and thus the flow of water between the bottom and the top of the impeller (or the space thereabove). It may be that in some applications improved performance will be obtained if a second impeller is included below impeller 38, as impeller 18 is used below impeller 22 in FIG. 1.

In the embodiment of FIG. 6 there is a tube 46 mounted on float 11. This tube is a part of a mounting plate 47 to which the motor 48 is connected by a plurality of mounting supports 49. Motor 48 rotates a shaft 51 which extends axially through the vertical passageway formed by tube 46. This rotation is in a direction indicated by arrow 52. At the bottom of shaft 46 is an impeller 18 corresponding to that described in connection with FIG. 1. At the top of tube 46 is a closure 53 and immediately below the closure is an impeller 54. Impeller 54 is, for all practical purposes, identical to impeller 18. It is not needed in all embodiments.

The closure 53 also forms an impeller. To this end it has six passageways 56 therethrough. These passageways extend between an outer, truncated conical surface 57 and a bottom annular opening 58. The passageways slant downwardly in the direction of rotation 52. Thus each passageway has a bottom surface 59 which is in the form of a scoop and functionally resembles a blade which has curvature in yet another direction.

The bottom of closure 53 defines a rim 61 which fits closely into the walls of a recess 62 in tube 46. Thus the bottom opening 58 of the closure is the same diameter as the diameter of the passageway within tube 46. The underside of the closure is substantially hollow due to the position of the passageways 56. For example, in one embodiment the passageways slant down from a horizontal plane at an angle of 30° and the inner sides of the passageways are tangent to vertical planes which are also tangent to shaft 51.

The arrangement is such that the total cross-sectional area of the six passageways is only slightly smaller than the cross-sectional area of that part of the passageway within tube 46 surrounding shaft 51. Thus there is little choking of the flow of the column of water forced upwardly through tube 46 by the impeller, or impellers, therein. However, the choking that does occur causes the streams of water exiting from the top of the passageways to project farther outwardly beyond the machine than will occur in the previously described embodiment. This action is enhanced by the centrifugal force being applied to the column of water within each passageway 56 as that column moves up and out through the passageway. Vertical vanes 63 are secured to the tube 46 and project into the passageway to prevent the column of water therein from rotating. They will not be needed in all embodiments.

By increasing the choking of the water pushed up the tube 46 and/or increasing the radial distance to the outer end of the column of water in the passageways 56, one can increase the "throw" (radius of the outer extremity of discharge) of the water from the machine. An embodiment for this purpose is illustrated in FIGS. 9 and 10. Here there is a shaft 65 which is rotated by motor 66 in the direction indicated by arrow 67. The shaft extends axially through the vertical passageway defined by tube 68. At the lower end of the shaft is an impeller 69. The impeller is below the level of the water that supports float 70 and forces a column of that water up through the tube 68.

At the top of the tube is a closure 72 which is secured to shaft 65 and rotates therewith. Extending through this closure are four tubes 73 which define passageways 74 therethrough. Like the embodiment of FIGS. 6–8, the bottom surface 75 of these tubes function as scoops or blades to pick up water from the top of the passageway within tube 68 and direct that water upwardly and outwardly. Of course, the tube being annular serves to confine the water so scooped up.

As compared to the embodiment of FIGS. 6–8, in the present embodiment the sum of the cross-sectional areas of passageways 74 is significantly less than the cross-sectional area of the passageway in tube 68. Also the passageways 74 are significantly longer. Under these circumstances the water discharged from passageways 74 will travel a noticeably greater distance from the axis of shaft 65 before again falling back on the body of water on which the apparatus is located. As a corollary, the volume of water pumped through the apparatus (other conditions being equal) will be less than the volume pumped through the embodiment of FIGS. 6–8 for example.

We claim:

1. In a pump for use in connection with a body of liquid such as water having a surface, said pump being of the type having tube means about a vertical axis, a device connected to the tube means to support the tube means with the top of the tube means above the surface of the liquid and the bottom of the tube means below the surface, a shaft extending vertically in the tube means, a power drive connected to the shaft to rotate the shaft in a given direction, and impeller means on the shaft with at least a portion of the impeller means below said surface to force liquid up the tube means to be expelled out the top of the tube means to fall back into the body of liquid, the improvement comprising:

said impeller means having a part thereof imparting upward and outward components of movement to the liquid, said part having a surface inclined downwardly and forwardly with respect to the direction of rotation, said surface having a leading edge and a trailing edge, said trailing edge extending a radial distance from the shaft greater than any other portion of the impeller means which may be above said trailing edge, whereby as said impeller means is rotated the liquid is scooped up at said leading edge and discharged off said trailing edge, said tube means defining a passageway which is inside the tube means and in the location of the impeller means is between the impeller means and the tube means and which at the top has outwardly open sides, the open cross-sectional area of said passageway being approximately at least as large at all locations above the bottom of said impeller means as it is at the bottom of the impeller means so that there is no significant choking of the flow of liquid in an upwardly and outwardly path of movement from said part, said passageway providing a clear path for outward movement of the liquid to which said part is imparting said upward and outward components of movement.

2. In a pump as set forth in claim 1, wherein the uppermost part of the tube flares outwardly in the shape of an inverted frustum of a cone, said impeller means having at least a major portion thereof in said part of the tube.

3. In a pump as set forth in claim 2, wherein the bottom of said part of the tube and the bottom of said impeller means are below said surface.

4. In a pump for use in connection with a body of liquid such as water having a surface, said pump being of the type having tube means about a vertical axis, a device connected to the tube means to support the tube means with the top of the tube means above the surface of the liquid and the bottom of the tube means below the surface, a shaft extending vertically in the tube means, a power drive connected to the shaft to rotate the shaft in a given direction, and impeller means on the shaft with at least a portion of the impeller means below said surface to force liquid up the tube means to be expelled out the top of the tube means to fall back into the body of liquid, the improvement comprising:

said impeller means having a part thereof imparting upward and outward components of movement to the liquid, said part having a surface inclined downwardly and forwardly with respect to the direction of rotation, said surface having a leading edge and a trailing edge, said trailing edge extending a radial distance from the shaft greater than any other portion of the impeller means which may be above said trailing edge, said part being at about the level of the top of the tube means for engaging the liquid rising through said passageway and imparting to the rising liquid a horizontally outward component of motion, whereby as said impeller means is rotated the liquid is scooped up at said leading edge and discharged off said trailing edge, said tube means defining a passageway which is inside the tube means and in the location of the impeller means is between the impeller means and the tube means and which at the top has outwardly open sides, the open cross-sectional area of said passageway being approximately at least as large at all locations above the bottom of said impeller means as it is at the bottom of the impeller means so that there is no significant choking of the flow of liquid in an upwardly and outwardly path of movement from said part.

5. In a pump as set forth in claim 4, wherein at least the major portion of said part is above the top of said tube.

6. In a pump as set forth in claim 5, wherein said part includes a hub attached to said shaft and a plurality of blades extending outwardly from said hub, the blades extending downwardly from the proximal ends thereof.

7. In a pump as set forth in claim 6, wherein said blades slope down at about a thirty degree angle and have about a thirteen pitch.

8. In a pump as set forth in claim 7, wherein said hub is an inverted frustum of a cone.

9. In a pump as set forth in claim 8, wherein the power device is a motor connected to the top of the shaft and said hub is substantially below the motor.

10. In a pump as set forth in claim 4, wherein said part includes a hub with a plurality of blades extending outwardly from the hub, said hub having the configuration of an inverted frustum of a cone.

11. In a pump as set forth in claim 10, wherein at least the major portion of said part is above the top of said tube.

12. In a pump for use in connection with a body of liquid such as water having a surface, said pump being of the type having a tube about a vertical axis, a device connected to the tube to support the tube with the top of the tube above the surface of the liquid and the bottom of the tube below the surface, a shaft extending vertically in the tube, a power drive connected to the shaft to rotate the shaft in a given direction, and impeller means on the shaft with at least a first portion of the impeller means below said surface to force liquid up the tube to the top thereof, the improvement comprising:

said impeller means having blade portions spaced about said shaft at the top of the tube, said portions sloping downwardly and forwardly in the given direction of rotation and each portion having a leading edge and a trailing edge, said trailing edge being exposed to the surrounding fluid for substantially the full length thereof whereby the blade portions scoop under the liquid previously raised to the top of the tube by said first portion and the liquid so scooped up is discharged off said trailing edge.

13. In a pump as set forth in claim 12, wherein each said blade portion is a respective individual blade, the impeller means including a hub, each blade having a proximal end secured to said hub.

14. In a pump as set forth in claim 12, wherein said impeller means defines a closure at the top of the tube which rotates with the shaft, said closure defining a plurality of openings through said closure, said openings slanting upwardly in the reverse of said given direction of rotation whereby the hub at each of said openings defines a bottom side along the opening, each said bottom side being a respective blade portion.

15. In a pump as set forth in claim 12 including stationary vane means within said tube for restraining the liquid therein against rotation.

\* \* \* \* \*